United States Patent [19]

Malek

[11] Patent Number: 4,863,328

[45] Date of Patent: Sep. 5, 1989

[54] LOCKING MECHANISM FOR THREADED COMPONENTS

[75] Inventor: Jack H. Malek, Northridge, Calif.

[73] Assignee: KDI American Products, Inc., Moorpark, Calif.

[21] Appl. No.: 147,503

[22] Filed: Jan. 25, 1988

[51] Int. Cl.[4] .......... F16B 39/32; F16L 35/00

[52] U.S. Cl. .......... 411/114; 411/949; 285/82; 285/91; 285/399

[58] Field of Search .......... 411/114, 115, 228, 227, 411/949, 961; 285/81, 82, 84, 85, 91, 399

[56] References Cited

U.S. PATENT DOCUMENTS

| | | | |
|---|---|---|---|
| 32,880 | 7/1861 | Lawrence et al. | 411/114 |
| 665,053 | 1/1901 | Berry | 411/114 |
| 1,813,640 | 7/1931 | Rossetti | 411/949 |
| 2,320,936 | 6/1943 | Kessler | 411/949 |
| 2,375,519 | 5/1945 | Burdick | 411/949 |
| 3,208,493 | 9/1965 | Holmes | 411/949 |

FOREIGN PATENT DOCUMENTS

| | | | |
|---|---|---|---|
| 1221842 | 6/1960 | France | 285/82 |

*Primary Examiner*—Neill R. Wilson
*Attorney, Agent, or Firm*—Noel F. Heal

[57] ABSTRACT

A locking mechanism for assembled threaded coponents, including a circumferential tongue on one of the components and a corresponding notch on the other component. As a locking position is approached, the tongue is biased out of its normal position by a camming surface adjacent to the notch, and is then released into the notch as the locking position is reached. Unlocking only requires the tongue to be moved out of the notch momentarily during rotation from the locking position.

2 Claims, 2 Drawing Sheets

Fig. 3.
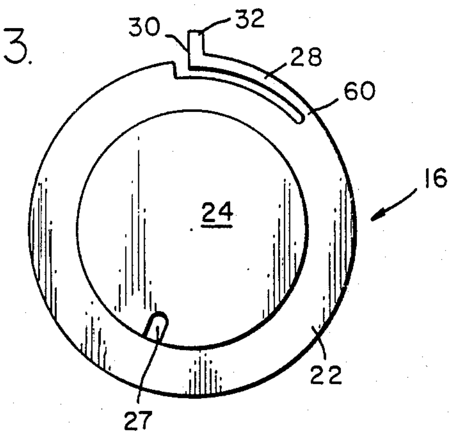
Fig. 4.
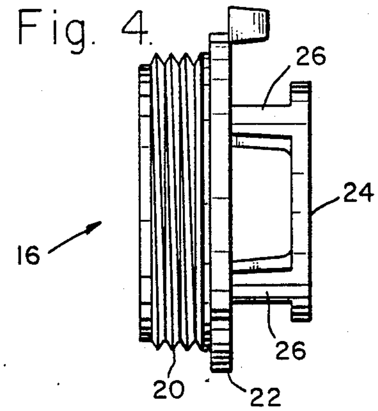
Fig. 5.
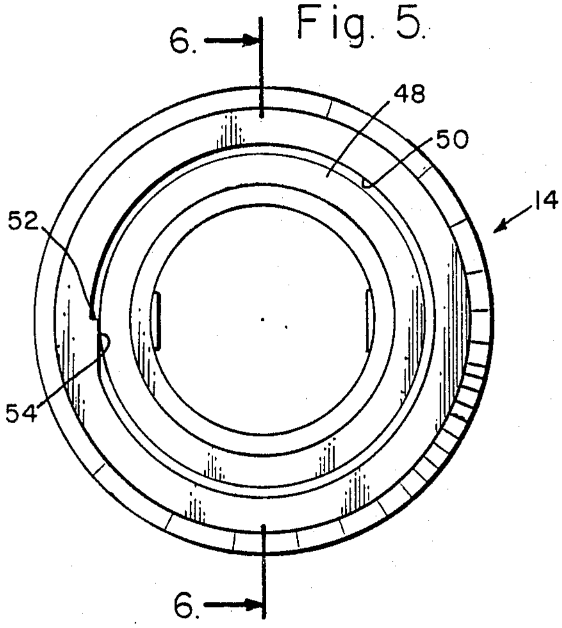
Fig. 6.
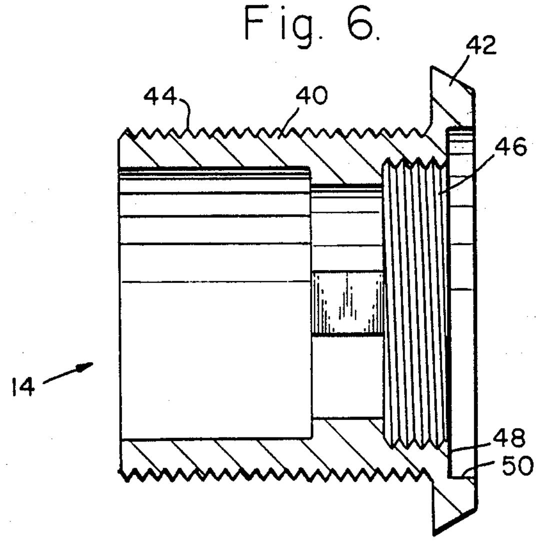
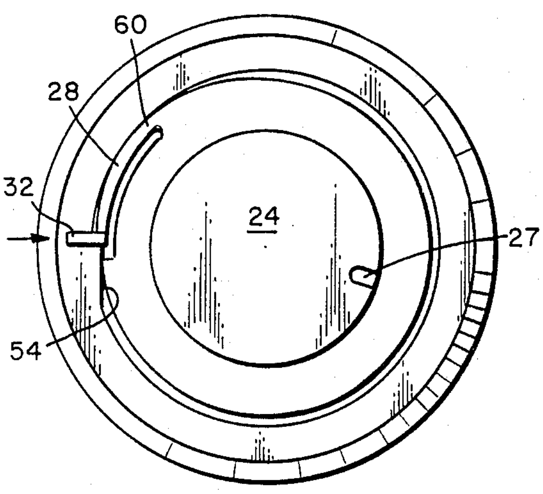
Fig. 7.
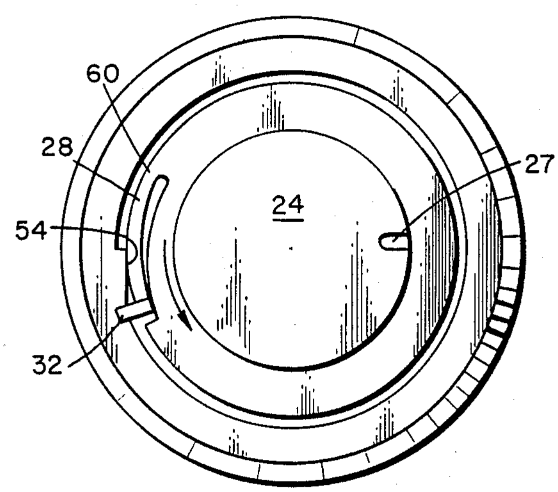
Fig. 8.

LOCKING MECHANISM FOR THREADED COMPONENTS

BACKGROUND OF THE INVENTION

This invention relates generally to locking mechanisms for threaded components and, more particularly, to locking devices for threaded water supply fixtures.

There is often a safety requirement for threaded devices to be locked into an engaged position. For example, in the field of spas, hot tubs, and jetted bathtubs (all of which will be referred to as "tubs"), water is supplied through supply pipes to openings in the wall of a tub, and fittings are attached to the ends of the supply pipes. In a typical arrangement, the fixture includes a bushing or sleeve that is secured by screw threads or by adhesive in the wall opening, and the pipe is engaged with the bushing and secured to it. Then an appropriate insert is engaged in the bushing by means of screw threads. The insert contains a number of internal passages through which the water flows from the pool or spa, and serves as a drain cover, directing water to a circulating pump an filter.

There are typically two requirements imposed on such structures by plumbing codes or by good design practice. First the insert portion of the structure should be removable, for cleaning or replacement. Second, and most important from the standpoint of this invention, the threaded insert must incorporate some type of locking device to prevent its inadvertent removal.

Locking devices for components secured by screw threads are typically of two basic types. There are lock nuts or lock washers that engage the same threads as the component being secured, and there are locking screw that engage in a radial hole in one of the components and, when tightened, bear down on or through the body of the other component to prevent relative rotation of the components.

Lock nuts and washers are not suitable in the application described above, since the threads are not usually accessible when the insert is engaged in the bushing. The solution usually adopted is to use a radially oriented locking screw, accessed by screw driver through an opening in the threaded insert. The principal difficulty with this type of locking arrangement is that the locking screw may completely disengage from the structure and become lost or misplaced. This problem is particularly acute in the hot tub application, where small locking screws are frequently lost through drain openings in the tub. Replacements may not be readily available, and the completion of maintenance may be delayed or prevented.

Accordingly, there is a clear need for a different type of locking mechanism for components secured together by screw threads. Ideally, the locking mechanism should be self-contained in one or both of the threaded components, and should not be removable. Of course, the locking mechanism should also be simple and convenient to use. The present invention satisfies these requirements.

SUMMARY OF THE INVENTION

The present invention resides in a self-contained locking mechanism for components secured together by screw threads. Briefly, and in general terms, the locking mechanism of the invention comprises first and second inter-engageable threaded components, a generally circumferential tongue formed integrally with the first component, the tongue having a free end that is resiliently movable to a limited degree in a radial direction, and a notch formed in the circumference of the second component, wherein the free end of the tongue engages in the notch in a locking position when the first and second components are fully engaged, and prevents reverse rotation of the two components.

More specifically, the tongue has an integral lug at its free end, to facilitate movement of the free end out of the notch when unlocking the mechanism. In the illustrative embodiment of the invention, the first component is externally threaded and the tongue is formed on an outer circumference such that its free end extends to a slightly greater radial distance than the remainder of the component circumference. The second component is internally threaded and the notch takes the form of a shoulder and a sloping camming surface on an inner circumference of the component. The free end portion of the tongue is compressed inwardly as it engages the camming surface, and then moves resiliently out again into the locking position as the free end passes the shoulder.

In the preferred form of the mechanism, the outer circumference of the first component, close to the tongue, has an enlarged-radius portion that engages the camming surface before the tongue, during an assembly operation, and provides a momentary increase in the torque needed to assemble the two components. This provides a warning that the locking position is being approached.

It will be appreciated from the foregoing that the present invention provides a convenient solution to the problem of locking threaded components in an engaged relationship without the use of removable locking screws. Other aspects and advantages of the invention will become apparent from the following more detailed description, taken in conjunction with the accompanying drawings.

BRIEF DESCRIPTION OF THE DRAWINGS

FIG. 3 is a plan view of a threaded insert that forms part of the screw fitting;

FIG. 4 is an elevational view of the threaded insert of FIG. 3;

FIG. 5 is a plan view of a threaded bushing that forms part of the screw fitting;

FIG. 6 is an elevational view of the threaded bushing of FIG. 5;

FIG. 7 is a plan view showing the threaded insert and the threaded bushing engaged in a locking position; and FIG. 8 is a plan view similar to FIG. 7, but showing the insert and the bushing in an unlocked position.

DESCRIPTION OF THE PREFERRED EMBODIMENT

Figure 1:
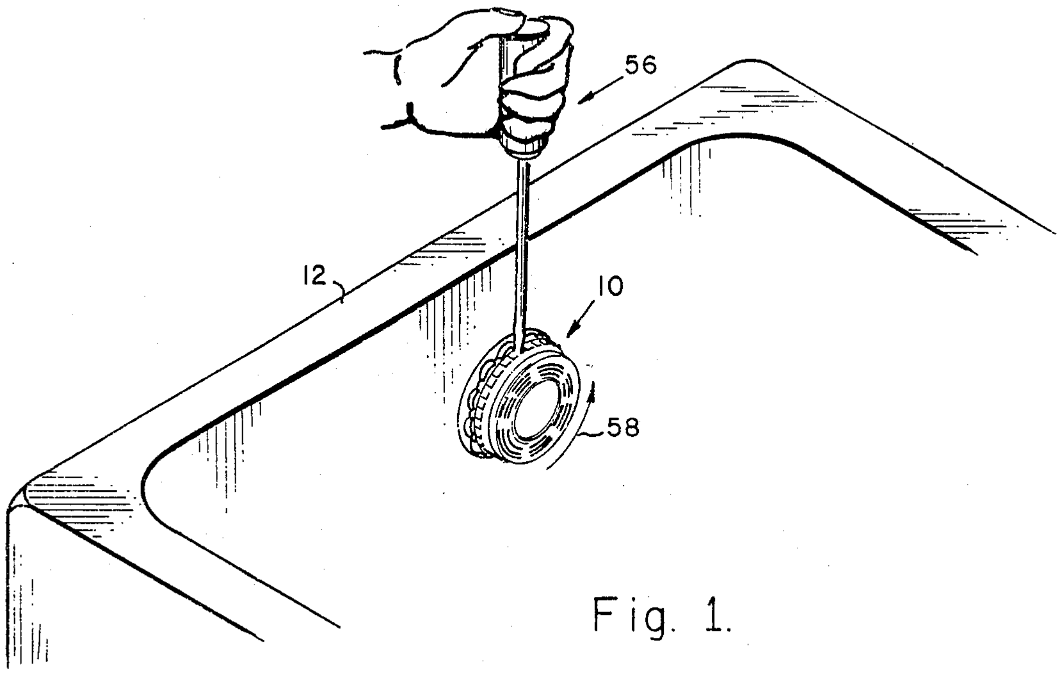
FIG. 1 is a perspective view of a screw fitting incorporating the present invention, installed in the wall of a tub.

As shown in the drawings for purposes of illustration, the present invention is concerned with locking mechanisms for components secured by screw threads. The illustrative structure is a fitting, indicated generally by reference numeral 10, for installation in the sidewall of a hot tub or similar apparatus, part of which is shown at 12 in FIG. 1. The fitting 10 provides a high-pressure water jet in the tub, but must be easily disassembled for maintenance or replacement.

Figure 2:
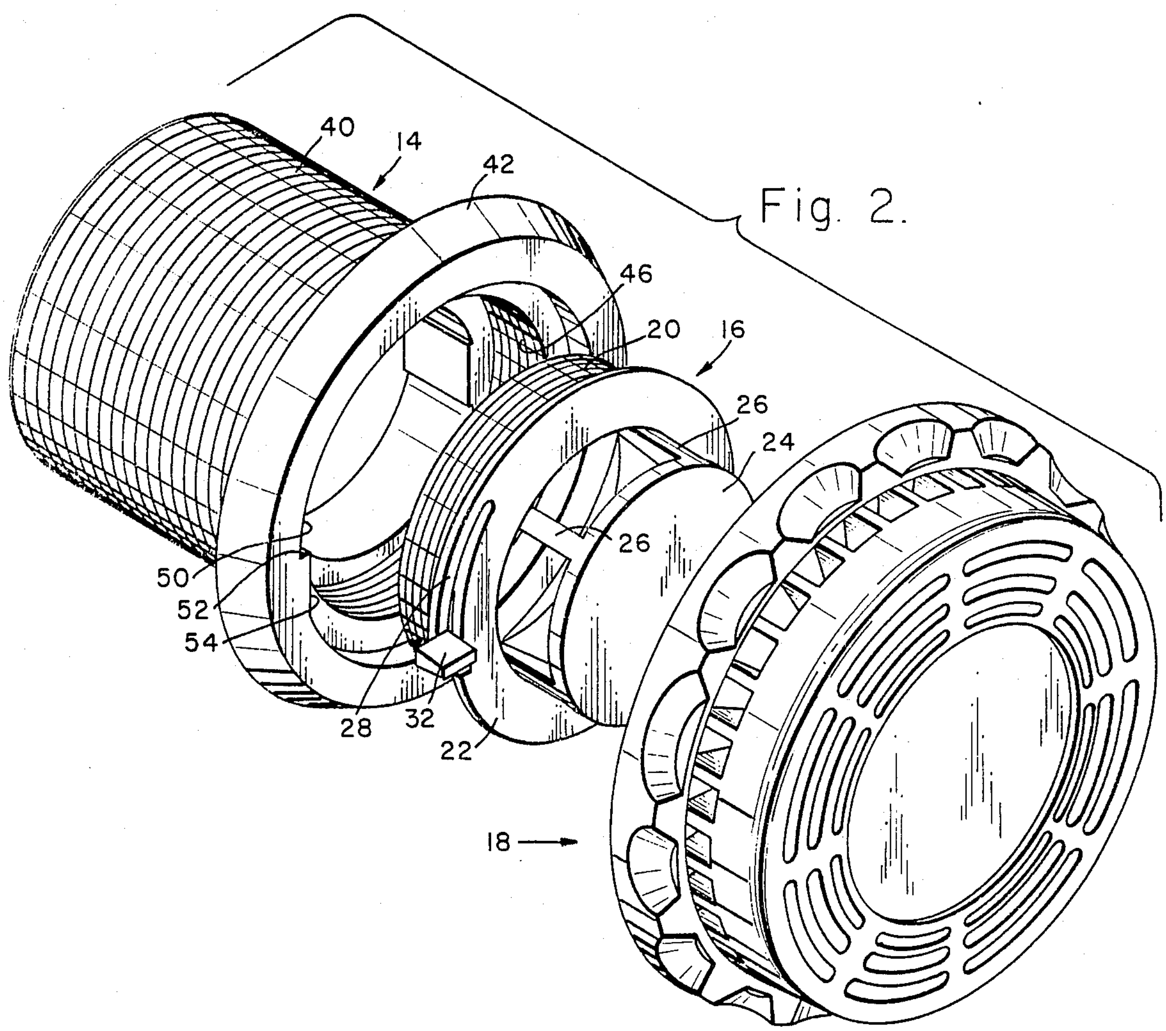
FIG. 2 is an enlarged, exploded perspective view of the screw fitting shown in FIG. 1.

FIG. 2 shows the principal components of the fitting 10. These include a threaded bushing 14, a threaded insert 16, and a cover 18. The bushing 14, which is both internally and externally threaded, is installed in an opening in the tub wall, and a water supply pipe (not shown) is secured to it, usually by an adhesive. The insert 16 is externally threaded, and engages the internal threads of the bushing 14. The cover 18 is permanently bonded to the threaded insert 16, but is shown as a separate component for convenience of illustration and explanation. The cover 18 has a number of internal passages to produce the desired flow pattern of water emerging from the fitting 10.

For maintenance and replacement purposes, the threaded insert 16, and with it the cover 18, must be easily removable from the bushing 16, but must also be able to be locked in place when assembled. Conventional locking screws may be inadvertently removed and lost, and are typically difficult to install.

In accordance with the invention, the threaded insert 16 and the bushing 14 are secured in an assembled condition by a self-contained locking mechanism that requires no additional or removable parts. As shown in the detailed drawings of FIGS. 3–8, the threaded insert 16 comprises an externally threaded cylindrical body 20, at one end of which there is formed an integral external flange 22. The insert 16 also includes an integral disk-shaped end piece 24, joined to the body 20 by four axial ribs 26. The end piece 24 is used to secure the insert 16 to the cover 18, and a locating notch 27 is provided in the end piece for this purpose.

One component of the locking mechanism is formed in the flange 22. A portion of the outer circumference of the flange 22 is slightly enlarged in radius, and has an integral and generally circumferential tongue 28 formed in it. The tongue 28 has one end integral with the flange 22, is of relatively uniform thickness, and has a free end 30 that is slightly separated from the flange, so that the free end may be moved radially to some degree. When the tongue free end 30 is moved inwardly and released, it moves resiliently back to its original position. Formed on the free end 30 of the tongue 28 is an integral lug 32, which protrudes out from the end 30, both in a radial sense and in an axial sense. As will be seen, the lug 32 facilitates unlocking of the mechanism.

The other component of the locking mechanism is contained within the threaded bushing 14, which is shown in more detail in FIGS. 5 and 6. The bushing 14 has a cylindrical body 40, with an external flange 42 at one end, an external thread 44 along almost its entire length, and an internal thread 46 extending part way in from the flange 42. Formed inside the flange 42 is an annular shoulder 48 that provides an inner circumferential surface 50. The surface 50 is circular except for an internal shoulder 52 extending radially inward. The shoulder is formed by an inwardly projecting portion of the surface 50, that provides a sloping camming surface 54 engageable by the free end 30 of the tongue 28 during assembly of the fitting 10.

When the threaded insert 16 is engaged in the internal thread 46 of the bushing 14 and rotated, the tongue 28 does not immediately engage the camming surface 54. Only on the last revolution of the threaded insert, during assembly, does the free end 30 of the tongue 28 engage the camming surface 54. The free end 30 is moved radially inward by the camming surface 54, until the free end reaches the shoulder 52, at which point the free end springs resiliently out again, as shown in FIG. 7. Any attempt to rotate the threaded insert in the reverse direction will then result in the free end 30 engaging the shoulder 52, which prevents the reverse rotation and effectively locks the two threaded components together.

Unlocking of the mechanism is effected by pressing radially inward on the free end 30 of the tongue 28 while rotating the threaded insert in the reverse direction. This action is facilitated by the presence of the lug 32 on the free end 30. The lug may be accessed by a screwdriver or similar tool through one of the passages in the cover 18, as indicated generally at 56 in FIG. 1. One counterclockwise revolution of the threaded insert 16, as indicated by the arrow 58 in FIG. 1, will raise the tongue 28 above the shoulder 52, and allow further rotation and disassembly.

It will be noted that the tongue 28 in its free position extends radially further out than the remainder of the outer circumference of the flange 22. Accordingly, when the root of the tongue, indicated at 60, reaches the camming surface 54 during assembly, as indicated in FIG. 8, there will be an increased resistance to rotation of the threaded insert 16 in the bush 14. This provides a warning that the locking position of the mechanism is being closely approached, so that care may be taken to avoid possible damage to the mechanism.

It will be appreciated from the foregoing that the present invention represents a significant advance in the field of locking mechanisms for threaded components. In particular, the invention provides a self-contained and automatic locking mechanism that requires no removable parts and no special tools to operate. No tools are needed to lock the mechanism, and only a screwdriver or similar tool is needed to unlock it. It will also be appreciated that, although an embodiment of the invention has been described in detail for purposes of illustration, various modifications may be made without departing from the spirit and scope of the invention. Accordingly, the invention is not to be limited except as by the appended claims.

I claim:

1. A self-contained locking mechanism for threaded components, the mechanism comprising:

first and second inter-engageable threaded components;

a generally circumferential tongue formed integrally with the first component, the tongue having a free end that is resiliently movable to a limited degree in a radial direction; and a notch formed in the circumference of the second component;

wherein the free end of the tongue engages in the notch in a locking position when the first and second components are fully engaged, and prevents reverse rotation of the two components;

and wherein the first component is externally threaded and the tongue is formed on an outer circumference such that its free end extends to a slightly greater radial distance than the remainder of the circumference of the component;

and wherein the second component is internally threaded and the notch takes the form of a shoulder and a sloping camming surface on an inner circumference of the component;

and wherein the free end of the tongue is compressed inwardly as it engages the camming surface, an then moves resiliently out again into the locking position as the free end reaches the shoulder;

and wherein the outer circumference of the first component close to the tongue has an enlarged-radius portion that engages the camming surface before the tongue, during an assembly operation, and provides a momentary increase in the tongue needed to assemble the two components, to indicate that the locking position is being approached.

2. A self-contained locking mechanism as defined in claim 1, wherein:

the tongue has an integral lug at its free end, to facilitate movement of the free end out of the notch when unlocking the mechanism.

* * * * *